(12) United States Patent
Aoki

(10) Patent No.: US 6,366,200 B1
(45) Date of Patent: Apr. 2, 2002

(54) METHOD OF DETERMINING THE OBJECT ON A SEAT FOR DETERMINING THE DEPLOYMENT MODE OF A SAFETY DEVICE

(75) Inventor: Hiroshi Aoki, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/656,222

(22) Filed: Sep. 6, 2000

Related U.S. Application Data

(60) Provisional application No. 60/152,338, filed on Sep. 7, 1999.

(51) Int. Cl.$^7$ .................................................. B60Q 1/00
(52) U.S. Cl. ........................ 340/438; 340/436; 340/667; 180/273; 280/735; 177/210 C
(58) Field of Search ................................ 340/438, 439, 340/666, 667, 436; 280/734, 735; 180/272, 273; 177/138, 144, 210 C

(56) References Cited

U.S. PATENT DOCUMENTS 5,232,243 A * 8/1993 Blackburn et al. .......... 280/732
5,494,311 A * 2/1996 Blackburn et al. .......... 280/735
5,624,132 A * 4/1997 Blackburn et al. .......... 280/735
6,218,632 B1 * 4/2001 McCarthy et al. .......... 177/144

* cited by examiner

Primary Examiner—Edward Lefkowitz
(74) Attorney, Agent, or Firm—Foley & Lardner

(57) ABSTRACT

To provide a method of determining the presence and the kind of the object on the seat of the passenger vehicle accurately. When the seat weight w is below $w_1$, it is determined that the seat vacant. When the seat weight is equal to or above $w_1$, determination is made whether or not the output p of the living body proximity sensor is below the threshold value $p_1$. In the case where the output p of the living body proximity sensor is below the threshold value $p_1$, it is determined that a child is sitting on the seat when the seat weight is below $w_2$, and that an adult is sitting on the seat when the seat weight is equal to or above $w_2$. When the output of the living body proximity sensor is equal to or above threshold value $p_1$, it is determined that a child seat is mounted on the seat.

17 Claims, 6 Drawing Sheets

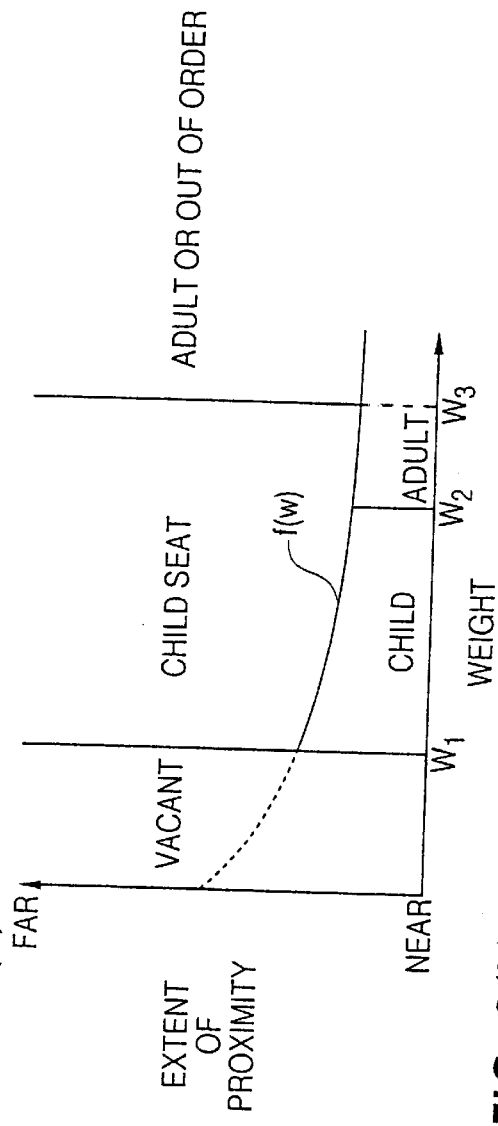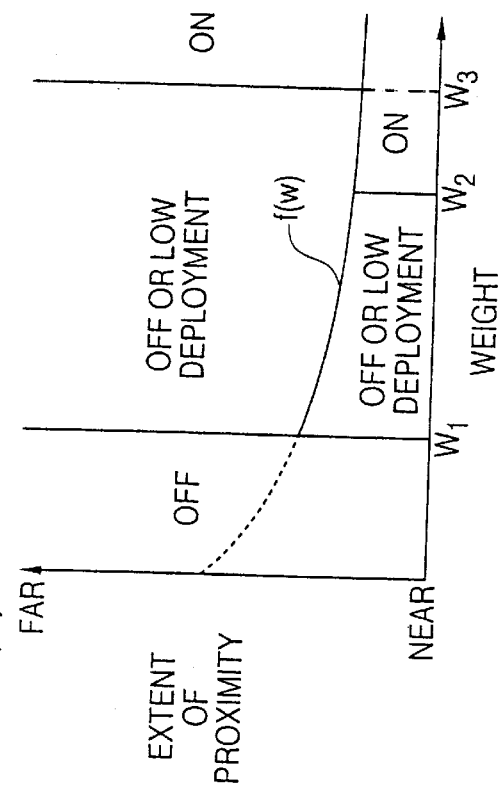
FIG. 6(a)
FIG. 6(b)

METHOD OF DETERMINING THE OBJECT ON A SEAT FOR DETERMINING THE DEPLOYMENT MODE OF A SAFETY DEVICE

This application claims priority to U.S. Provisional Application Ser. No. 60/152,338, filed Sep. 7, 1999 is hereby incorporated by reference herein in their entirety.

FIELD OF INVENTION

The present invention relates to a method of determining the presence of an object and the type of object on the seat of a passenger vehicle, and a method of determining the deployment of a safety device, particularly airbag deployment.

DESCRIPTION OF THE RELATED ART

For controlling the winding of the seat belt or deployment of the airbag, it is inevitable to determine whether or not the seat of the passenger vehicle is vacant, and if not, whether the object present on the seat is a child, an adult, a child seat, or a child seat with a child sitting thereon.

Conventionally, such determination has been made by the output values from the seat weighing instrument mounted to the seat. In other words, when the weight of the seat is below the prescribed value, it is determined that the seat is vacant, and when the value is within a prescribed range, it is determined that a child is sitting or a child seat is mounted on the seat, and when the value is over a prescribed value, it is determined that an adult is sitting on the seat.

Concerning deployment control of the airbag, a no-deployment mode (mode that the airbag is not deployed in case of collision) is selected when it is determined that the seat is vacant; a no-deployment mode or low-deployment mode (mode that the airbag is deployed at a low speed or at low pressure in case of a collision) is selected when it is determined that a child or a child seat is present on the seat; the normal mode is selected when it is determined that an adult is present on the seat. Of course, this method selects the deployment mode of the airbag directly according to the output of the seat weighing instrument, without determining what type of object is on the seat.

However, a method of determining the object on the seat only by the output of the seat weighing instrument as conventionally employed may lead to an inaccurate determination. For example, when the weight of the child seat is heavy or when the child seat is strongly restrained to the seat by a seat belt and a child is sitting on the child seat, the total weight may exceed the value by which the seat is determined to have an adult on the seat. In such a case, the airbag may deploy quickly in the normal mode With such circumstances, it is an object of the present invention to provide a method of determining the presence and the type of object on the seat accurately and a method of determining the deployment mode of the airbag accurately.

SUMMARY OF THE INVENTION

The first embodiment of the invention is a method of determining the presence and the type of object on the seat of the passenger vehicle, including determining whether the seat is vacant, and determining whether the object present on the seat is a child seat, a child, or an adult by the combination of the outputs from the seat weight sensor and a living body proximity sensor.

In this embodiment, the vacancy of the seat or the type of on-board object is determined not only by the seat weight sensor but also by a living body proximity sensor. The living body proximity sensor is affected by the electrostatic capacitance or the electric conductivity of the living body and produces output according to the extent of proximity. (Other types of living body proximity sensors can be envisioned by those of skill in this art.) Because the vacancy of the seat and the type of on-board object are determined by the combination of outputs from the two types of sensors, a more accurate determination can be performed in comparison with the conventional method.

The second embodiment of the invention is the first embodiment, characterized in that:
(a) when the seat weight is below the prescribed value $w_1$, it is determined that the seat is vacant; and
(b) when the seat weight is equal to or above the prescribed value $w_1$; and
(b1) when the output value of the living body proximity sensor shows that the living body is in the proximity thereof, it is determined that a child is present on the seat when the seat weight is below a prescribed value $w_2$ ($w_1<w_2$), and an adult is present on the seat when the seat weight is equal to $w_2$ or above,
(b2) when the output value of the living body proximity sensor does not show that a living body is in the proximity thereof, it is determined that a child seat is present on the seat.

In this embodiment, the output of the seat weight is examined first and then it is determined that the seat is vacant when the seat weight is below the prescribed value $w_1$, and that something is on the seat when the seat weight is equal to the prescribed value $w_1$ or above. When the seat weight is equal to the prescribed value or above, the type of on-board object has to be determined. At first, the living body proximity sensor is utilized to determine whether a living body is indicated. A threshold value of the output of the living body proximity sensor is set and the output of the sensor is determined to be equal to, above, or below a threshold value.

When the output of the living body proximity sensor indicates that a living body is in its proximity, a human being has been determined as presently sitting directly on the seat. The next step is to determine whether an adult or child is sitting there. A child is sitting on the seat when the seat weight is below a prescribed value $w_2$ ($w_1<w_2$), and that an adult is sitting on the seat when the seat weight is equal to or above as the prescribed value $w_2$.

When the output of the living body proximity sensor does not indicate the presence of a living body, it is determined that a human being is not sitting on the seat but that a child seat is mounted thereon (including the case where a child is sitting on the child seat).

The third embodiment of the invention is the first embodiment characterized in that:
(a) when the seat weight is below the prescribed value $w_1$, it is determined that the seat is vacant; and
(b) when the seat weight is equal to or above the prescribed value $w_1$; and
(b1) when the output value of the living body proximity sensor shows that the living body is in the proximity thereof, it is determined that a child is present on the seat when the seat weight is below a prescribed value $w_2$ ($w_1<w_2$), and an adult is present on the seat when the seat weight is $w_2$ or above, or
(b2) when the output value of the living body proximity sensor does not show that the living body is in the proximity thereof, it is determined that a child seat is present on the seat when the seat weight is below a prescribed value $w_3$ ($w_1 < w_3$), and that an adult is present on the seat or the sensor is out of order when the seat weight is equal to $w_3$ or above.

In this embodiment, the output of the seat weight is examined first, and then it is determined that the seat is vacant when the seat weight is below the prescribed value $w_1$ and that something is on the seat when the seat weight is equal to or above the prescribed value $w_1$. When the seat weight is equal to the prescribed value or above, the type of on-board object has to be determined. At first, a living body proximity sensor is utilized to determine whether a living body is indicated. A threshold value of the output of the living body proximity sensor is set and the output of the sensor is determined to be equal to, above, or below the threshold value.

When the output of the living body proximity sensor indicates that a living body is in its proximity, a human being has been determined as presently sitting directly on the seat. The next step is to determine whether an adult or child is sitting there. A child is sitting on the seat when the seat weight is below a prescribed value $w_2$ ($w_1 < w_2$) and that an adult is sitting on the seat when the seat weight is equal to or above the prescribed value $w_2$.

When the output of the living body proximity sensor does not indicate the presence of a living body, it is determined that a human being is not sitting on the seat but that a child seat is mounted thereon (including the case where a child is sitting on the child seat), or the sensor is out of order. When the seat weight is below the prescribed value $w_3$ ($w_1 < w_3$), it is determined that the child seat is mounted thereon (including the case where a child is sitting on the child seat), and when it is equal to or above $w_3$, it is determined that the adult is sitting on the seat or the sensor is out of order. When the seat weight is equal to or above $w_3$, the outputs from the seat weighing instrument and from the living body proximity sensor are not matched. In the case where it is safer to determine that an adult is sitting on the seat to exercise various controls, it is adapted to determine that an adult is sitting on the seat. Where exercising controls under such a determination is dangerous, it is adapted to give an alarm indicating that the sensor is out of order. The values of $w_2$ and $w_3$ are normally different, but they may be the same value in some cases.

The fourth embodiment of the invention is the first embodiment, characterized in that:

(a) when the seat weight is equal to or below the prescribed value $w_1$, it is determined that the seat is vacant; and (b) when the seat weight is equal to or above the prescribed value $w_1$; and (b1) when the output value p of the living body proximity sensor is smaller than the function f(w) determined by the seat weight $w_1$, it is determined that a child is present on the seat when the seat weight is below the prescribed value $w_2$ ($w_1 < w_2$), and an adult is present on the seat when it is equal to or above $w_2$, (b2) when the output value of the living body proximity sensor is equal to or above the function f(w) determined by the seat weight w, it is determined that a child seat is present on the seat, and that an adult is sitting on the seat or the sensor is out of order when the value is equal to or above $w_3$, where the output p of the living body proximity sensor becomes smaller when the living body is in the proximity thereof.

In this embodiment, the output of the seat weight is examined first and then it is determined that the seat is vacant when the seat weight is below the prescribed value $w_1$, and that something is on the seat when the seat weight is equal to or above the prescribed value $w_1$. When the seat weight is equal to or above the prescribed value, the type of on-board object has to be determined. A living body proximity sensor is used and a threshold value of the output of the living body proximity sensor is set to the function f(w) that is determined by the output w of the seat weight sensor, in contrast to the second embodiment and the third embodiment.

The reason is that the output of the living body proximity sensor may differ according to the size of the living body (human being) sitting on the seat. In other words, when an adult whose weight and the sitting area is larger than those of a child is sitting on the seat, the output of the living body proximity sensor is shifted to the side of "proximity" in comparison with the case where a small child is sitting on the seat.

Therefore, considering that the sitting area is large when the weight is heavy, these values are represented by the seat weight, and the threshold value is approximated by the function f(w) defined by the output $w_1$ of the seat weight sensor. Assuming that the larger the weight and the sitting area are, the smaller the output value of the living body proximity sensor becomes, f(w) is a monotone decreasing function. However, when the actual output of the living body proximity sensor is smaller than the threshold value f(w), it is determined that a human being is sitting on the seat. When the seat weight is below the prescribed value $w_2$ ($w_1 < w_2$), it is determined that a child is sitting on the seat. When the seat weight is equal to or above $w_2$, it is determined that an adult is sitting on the seat.

When the output of the living body proximity sensor is equal to or above the threshold value f(w) determined by the seat weight $w_1$, it is determined that there is no human being sitting directly on the seat, but that a child seat is mounted on the seat (including the case where a child is sitting on the child seat) or the sensor is out of order. Therefore, when the seat weight is below the prescribed value $w_3$ ($w_1 < w_3$), it is determined that a child seat is mounted on the seat (including the case where a child is sitting on the child seat). When the seat weight is equal to or above $w_3$, it is determined that an adult is sitting on the seat or the sensor is out of order. When the seat weight is equal to or above $w_3$, the outputs from the seat weighing instrument and from the living body proximity sensor are not matched. In the case where it is safer to determine that an adult sitting on the seat to exercise various controls, it is adapted to determine that an adult is sitting on the seat, and where exercising controls under such a determination is dangerous, it is adapted to give an alarm indicating that the sensor is out of order. The values of $w_2$ and $w_3$ are normally different, but it may be the same value in some cases.

The fifth embodiment of the invention is a method of determining the airbag deployment mode, characterized in that the deployment mode is determined by the combination of the output from the seat weight sensor and that from the living body proximity sensor mounted on the seat.

In this embodiment, the living body proximity sensor as well as the seat weight sensor is used for determining the airbag deployment mode. The living body proximity sensor is, when the living body is in the proximity thereof, affected by the electrostatic capacitance or the electric conductivity of the living body and produces output according to the extent of proximity. In this embodiment, because determination of the deployment mode of the airbag is by the combination of outputs from two types of sensors, accurate determination can be performed in comparison with the conventional method.

The sixth embodiment of the invention is the fifth embodiment characterized in that:

(a) when the seat weight is below the prescribed value $w_1$, the airbag is not deployed; and (b) when the seat weight is equal to or above the prescribed value $w_1$; and (b1) when the output of the living body proximity sensor shows that the living body is in the proximity thereof, the no-deployment mode or the low deployment mode is selected when the seat weight is below the prescribed value $w_2$ ($w_1 < w_2$), and the normal deployment mode is selected when the seat weight is equal to or above $w_2$, and (b2) when the output of the living body proximity sensor does not show that living body is in the proximity thereof, the no-deployment mode or low-deployment mode is selected.

The seventh embodiment of the invention is the fifth embodiment, characterized in that:

(a) when the seat weight is below the prescribed value $w_1$, the no-deployment mode is selected; and (b) when the seat weight is equal to or above the prescribed value $w_1$; and (b1) when the output of the living body proximity sensor shows that the living body is in the proximity thereof, the no-deployment mode or the low deployment mode is selected when the seat weight is below the prescribed value $w_2$ ($w_1 < w_2$), and the normal deployment mode is selected when the seat weight is equal to or above $w_2$, (b2) when the output of the living body proximity sensor does not show that living body is in the proximity thereof, the no-deployment mode or low deployment mode is selected when the seat weight is below the prescribed value $w_3$ ($w_1 < w_3$), and the normal deployment mode is selected when the seat weight value is equal to or above $w_3$.

The eighth embodiment of the invention is the fifth embodiment, characterized in that:

(a) when the seat weight is below the prescribed value $w_1$, the no-deployment mode is selected; and (b) when the seat weight is equal to or above the prescribed value $w_1$; and (b1) when the output p of the living body proximity sensor is smaller than the function f(w) determined by the seat weight w, the no-deployment mode or the low deployment mode is selected when the seat weight is below the prescribed value $w_2$ ($w_1 < w_2$), and the normal deployment mode is selected when the seat weight is equal to or above $w_2$, (b2) when the output from the living body proximity sensor is equal to or above the function f(w) that is determined by the seat weight $w_1$, the no-deployment mode or the low deployment mode is selected when the seat weight $w_1$ is smaller than $w_3$ ($w_1 < w_3$), and the normal deployment mode when the seat weight is equal to or above $w_3$, where the output of the living body proximity sensor p becomes smaller when the living body is in the proximity thereof.

In the sixth embodiment of the eighth embodiment, the airbag is selected to be the no-deployment mode when the seat is vacant, and the no-deployment mode or the low-deployment is selected when a child is sitting on the seat or when a child seat is mounted on the seat, and the normal-deployment mode is selected when an adult is sitting on the seat or the sensor is out of order. To the determination thereof, a logic described in the second embodiment and the third embodiment is applied.

BRIEF DESCRIPTION OF THE DRAWINGS

FIG. 6 shows the second example of the carrying object determining logic and the airbag deployment mode determining logic.

DETAILED DESCRIPTION OF THE PREFERRED EMBODIMENT

Figure 1A:
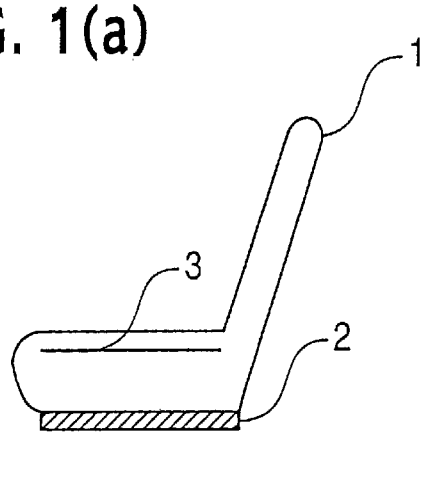
FIG. 1 shows examples of the layout of the apparatus used for implementing the present invention.

Referring now to the drawings, the embodiments of the present invention will now be described. FIG. 1 is a layout of the system used in implementing the present invention. In FIG. 1, a reference numeral 1 denotes a seat, 2 and 2' denote a seat weighing instrument, and 3 denotes a living body proximity sensor.

Figure 1B:
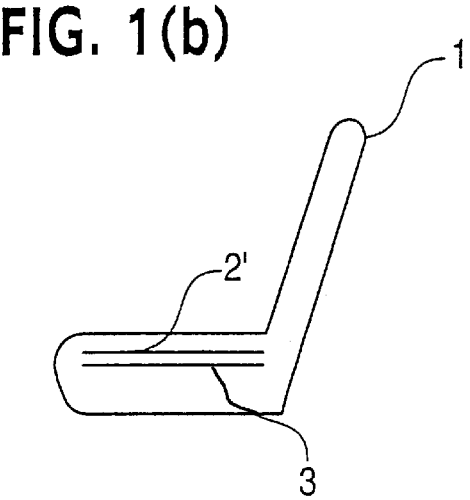
Figure 1C:
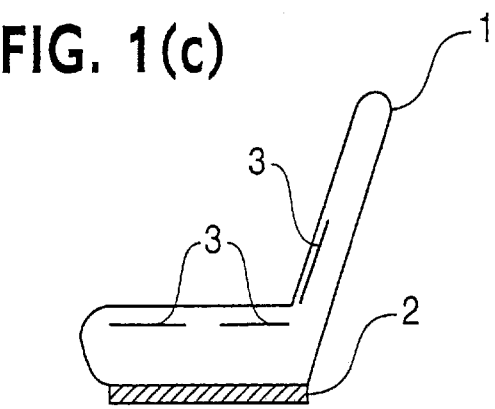

In FIG. 1(a), the seat weighing instrument 2 is provided at the supporting portion that supports the seat 1, which is a very common case. The living body proximity sensor 3 is embedded right below the surface of the sitting surface of the seat 1. In FIG. 1(b), the seat weighing instrument 2' is embedded right below the sitting surface of the seat 1. In FIG. 1(c), the living body proximity sensor 3 is divided into a plurality of pieces, and some of them are embedded in the seatback of the seat 1. The present invention may be implemented in any one of layouts shown from (a) to (c).

FIG. 2 shows an example of the living body proximity sensor. In the following figures, the detailed description may be omitted for the identical components by designating identical reference numbers thereto. In FIG. 2, reference numerals 4a to 4c designate electrodes and 5a and 5b designate coils.

Figure 2A:
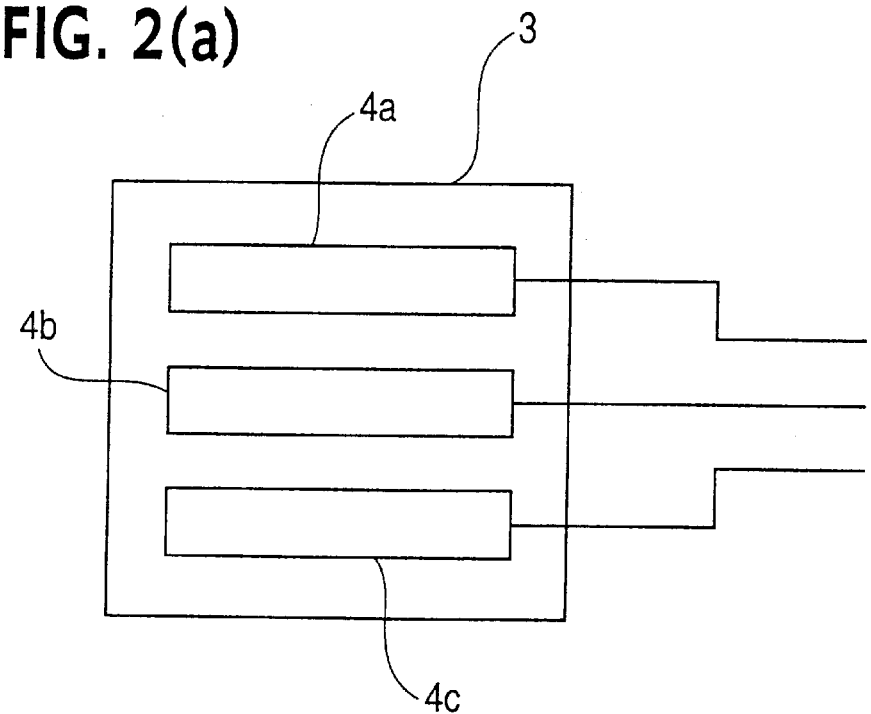
FIG. 2 shows examples of the living body proximity sensor.

In the living body proximity sensor shown in FIG. 2(a), when a human being approaches the living body proximity sensor 3, the electrostatic capacitance of the human being changes the electrostatic capacitance among electrodes 4a to 4c. Therefore, by measuring the electrostatic capacitance among the electrodes 4a to 4c, a determination can be made whether a human being is sitting on the seat or not. When an adult is sitting on the seat, the area that is affected by the electrostatic capacitance is larger than the case where a child is sitting on the seat, whereby variations in the electrostatic capacitance is larger in the case where an adult is sitting on the seat than the case where a child is sitting on the seat. When there is an elastic body interposed between the sitting surface of the seat and the living body proximity sensor 3, deformation of the elastic body is larger in the case where a child is sitting on the seat than the case where an adult is sitting on the seat, and thus the body of the human being comes nearer to the living body proximity sensor 3, whereby variations in the electrostatic capacitance is larger in the case where an adult is sitting on the seat than the case where a child is sitting on the seat.

Figure 2B:
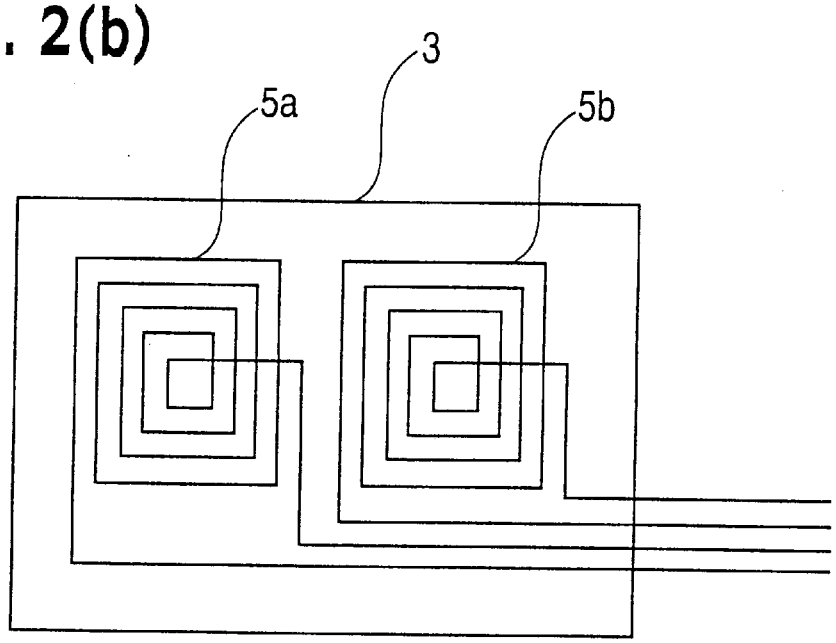

FIG. 2(b) illustrates a living body proximity sensor of the electromagnetic induction type, wherein a high frequency current is fed to the coil 5a and a voltage induced to the coil 5b that is in the proximity thereof is measured. When the living body approaches the living body proximity sensor 3, an eddy current is fed to the human body due to its electric conductivity, and thus the voltage generated in the coil 5b varies. Therefore, by measuring the voltage in the coil 5b, the sensor 3 can detect that a human being is in the proximity thereof. The reason why the larger variations in the output is obtained in the case where an adult is sitting on the seat than the case where a child is sitting on the seat is the same as the sensor of the electrostatic capacitance type as is described above.

Figure 3:
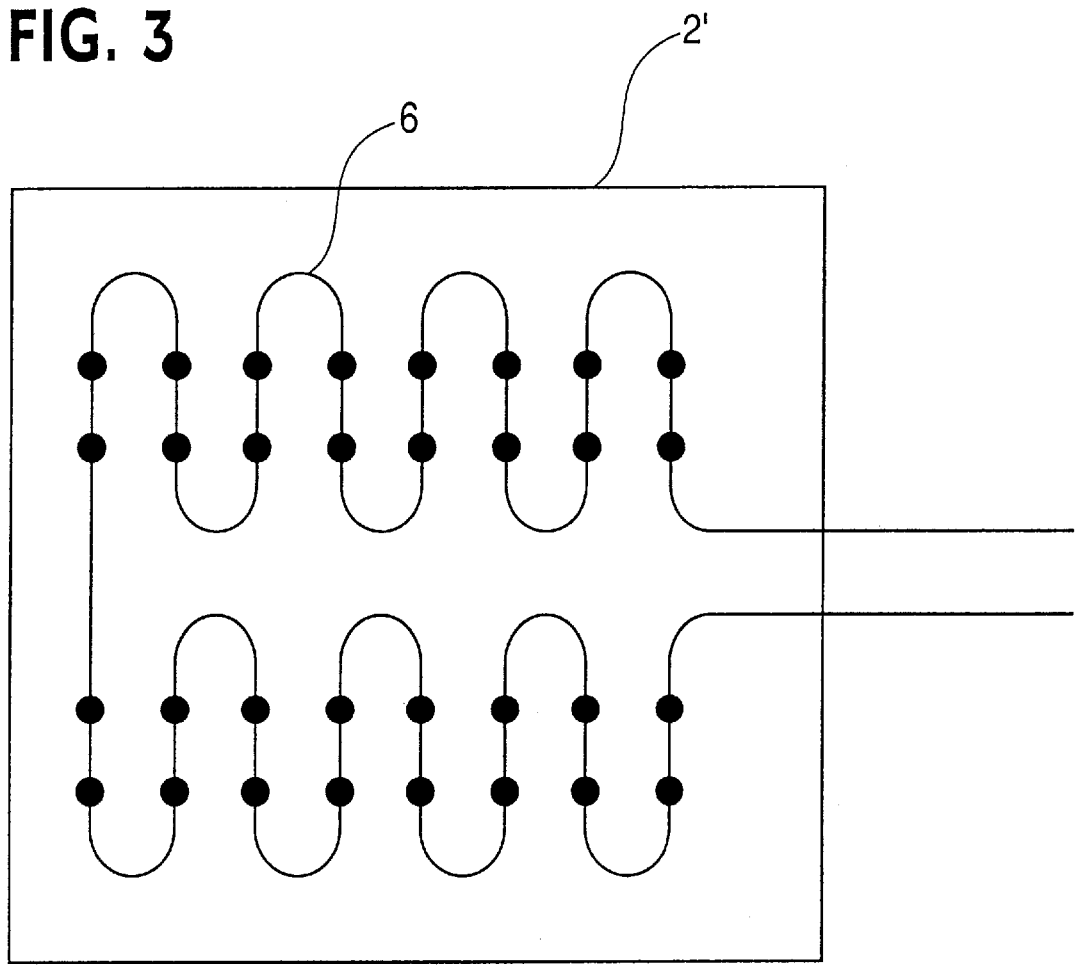
FIG. 3 shows examples of the seat weighing instrument used by being embedded in the sitting surface of the seat.

FIG. 3 is an example of the seat weighing instrument 2' used by being embedded in the seating surface of the seat 1. In FIG. 3, a reference numeral 6 designates a pressure sensitive resistance array. In the pressure sensitive resistance array 6, the pressure sensitive elements are arranged in series in a zigzag relationship and the resistance value of each pressure sensitive resistance element varies when subjected to the pressure. Because a number of the pressure sensitive elements are connected in series, large variations in resistance may be observed from the pressure sensitive array 6. By embedding such a seat weighing instrument 2' on the sitting surface of the seat 1, the load of the human being or the child seat present on the seat can be measured. While it is better to mount the weighing instrument on the position that supports the load of the seat to measure accurately as shown in FIG. 1(a), the seat weighing instrument 2' is also possible for determination with rough accuracy, for example, discrimination between an adult and child.

By combining the seat weighing instrument and the living body proximity sensor together, an example of the logic to determine whether the seat is vacant or not, and if not, what is on the seat (hereinafter referred to as "carrying object determination"), and the airbag deployment mode determination logic will be shown below.

Figure 4A:
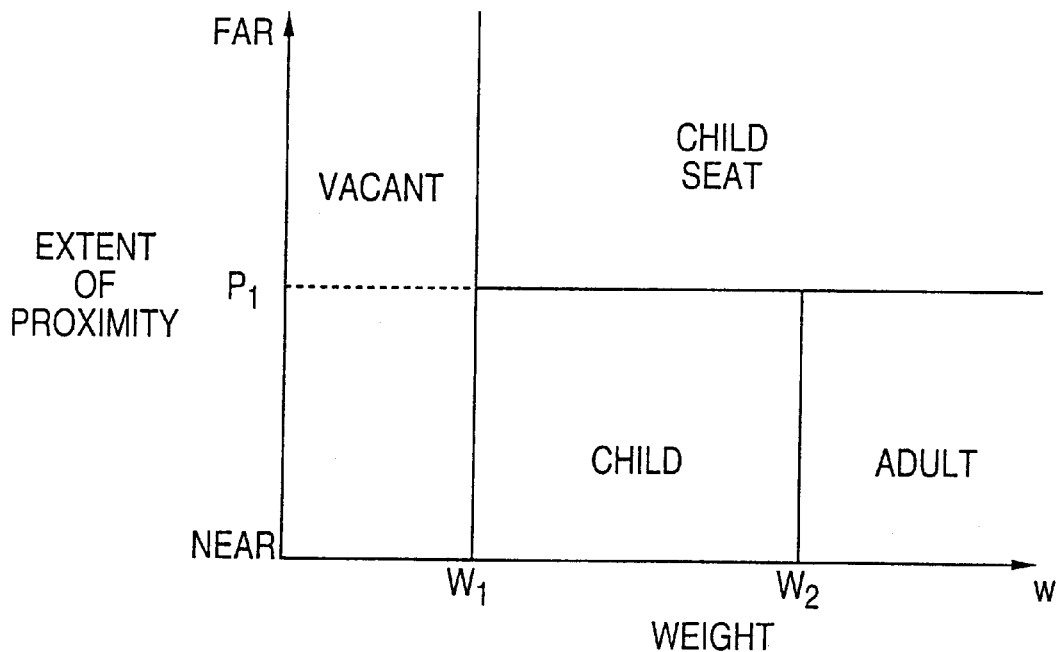
FIG. 4 shows the first example of the carrying object determining logic and the airbag deployment mode determining logic.
Figure 4B:
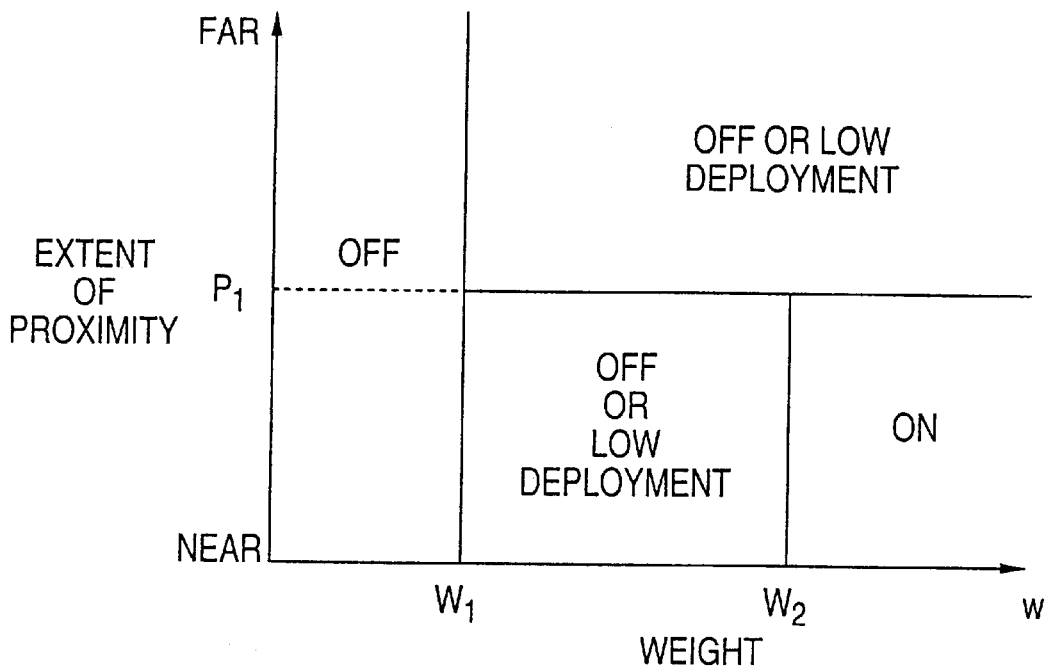

FIG. 4 is a first example showing such logic. FIG. 4(a) is the carrying object determination logic, and FIG. 4(b) is the airbag deployment mode determination logic. In the carrying object determination logic, when the seat weight w is below $w_1$, it is determined that the seat is vacant. When the seat weight is equal to or above $w_1$, the determination is made whether or not the output p of the living body proximity sensor is below the threshold value $p_1$ (whether or not the output of the living body proximity sensor decreases when a human being is in the proximity thereof).

In the case where the output p of the living body proximity sensor is below the threshold value $p_1$ it is determined that a child is sitting on the seat when the seat weight is below $w_2$, and that an adult is sitting on the seat when the seat weight is equal to or above $w_2$.

When the output p of the living body proximity sensor is equal to or above the threshold value $p_1$ it is determined that a child seat is mounted on the seat (including the case where a child is sitting on the child seat).

In the airbag deployment mode determination logic, when the seat weight w is below $w_1$, the no-deployment mode (OFF) is selected. When the seat weight is equal to or above $w_1$, the determination is made whether or not the output p of the living body proximity sensor is below the threshold value p.

In the case where the output p of the living body proximity sensor is below the threshold value $p_1$, the no-deployment mode or the low deployment mode is selected when the seat weight is below $w_2$, and the normal deployment mode (ON) is selected when the seat weight is equal to or above $w_2$.

In the case where the output p of the living body proximity sensor is equal to or above the threshold value $p_1$, the no-deployment mode or the low deployment mode is selected.

Figures 5A, 5B:
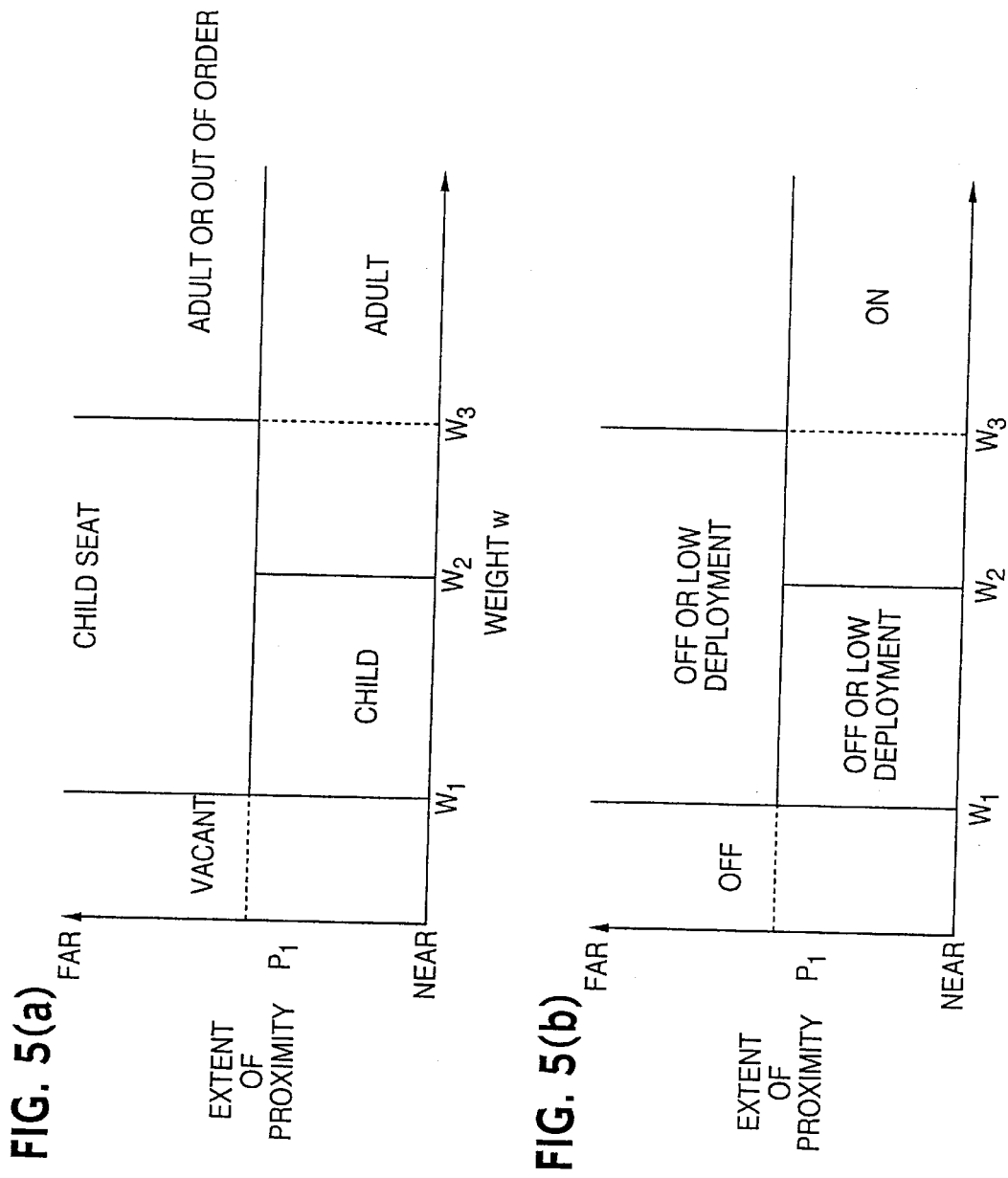
FIG. 5 shows the second example of the carrying object determining logic and the airbag deployment mode determining logic.

FIG. 5 is the second example showing the carrying object determination logic, and the airbag deployment mode determination logic. FIG. 5(a) illustrates the carrying object determination logic and FIG. 5(b) illustrates the airbag deployment mode determination logic.

In the carrying object determination logic, when the seat weight w is below $w_1$, it is determined that the seat is vacant. When the seat weight is equal to or above $w_1$, the determination is made whether the output p of the living body proximity sensor is below the threshold value $p_1$.

When the output p of the living body proximity sensor is below the threshold value $p_1$, it is determined that a child is sitting on the seat. When the seat weight is equal to or above $w_2$, it is determined that an adult is sitting on the seat.

In the case where the output p of the living body proximity sensor is equal to or above the threshold value $p_1$, it is determined that a child seat is mounted on the seat (including the case where a child is sitting on the child seat) when the seat weight is below $w_3$. When the seat weight is equal to or above $w_3$, the seat weighing instrument and the living body proximity sensor are not matched, and thus it is determined that an adult is sitting on the seat or the sensor is out of order.

In the airbag deployment mode determining logic, when the seat weight w is below $w_1$, the no-deployment mode (OFF) is selected. When the seat weight is equal to or above $w_1$, the determination is made whether the output p of the living body proximity sensor is below the threshold value $p_1$.

In the case where the output p of the living body proximity sensor is below the threshold value $p_1$, the no-deployment mode or the low-deployment mode is selected when the seat weight is below $w_2$, and the normal deployment mode (ON) is selected when the seat weight is equal to or above $w_2$.

In the case where the output p of the living body proximity sensor is equal to or below the threshold value $p_1$, the no-deployment mode or the low-deployment mode is selected when the seat weight is below $w_3$. When the seat weight is equal to or above $w_3$, the seat weighting instrument and the living body proximity sensor are not matched, and thus the normal deployment mode is selected for safety reasons.

As is clear in FIG. 5, in the airbag deployment mode determining logic, it is also possible to make the determination whether the seat weight is equal to or above $w_3$ in the first place, and if it is so, then the normal deployment mode is selected without considering the output of the living body proximity sensor. Such a modification of the logic is apparent to those skilled in the art and is included within the equal scope of the invention.

FIG. 6 is a second example showing the carrying object determining logic and the airbag deployment mode determining logic, wherein FIG. 6(a) illustrates the carrying object determining logic and FIG. 6(b) illustrates the airbag deployment mode determining logic.

In the carrying object determining logic, it is determined that the seat is vacant when the seat weight w is below $w_1$. When the seat weight w is equal to or above $w_1$, the determination is made whether the output p of the living body proximity sensor is below the threshold value determined by the function f(w) which is in turn determined by the seat weight w.

When the output p of the living body proximity sensor is below the threshold value, it is considered that a human being is sitting on the seat. When the seat weight is below $w_2$, it is determined that a child is sitting on the seat, and when the seat weight is equal to or above $w_2$, it is determined that an adult is sitting on the seat. In the case where the value is equal to or above the threshold value, the no-deployment mode and the low deployment mode is selected when the seat weight is below $w_3$. When the seat weight is equal to or above $w_3$, the seat weighing instrument and the living body proximity sensor are not matched, and thus the normal deployment mode is selected for safety reasons.

As shown in FIG. 6, in the airbag deployment mode determining logic, the determination is made whether the seat weight is equal to or above $w_3$ in the first place, and if it is so, the normal deployment mode may be selected without considering the output of the living body proximity sensor. Such a modification of the logic is apparent to those skilled in the art, and included within the equal scope of the invention.

As is described thus far, in the present invention, since the determination of the vacancy of the seat of the kind of the carrying object, or the determination of the airbag deployment mode is made by the combination of the outputs from two types of sensors, a more accurate determination can be performed in comparison with the conventional method.

While the present invention has been described by way of example and in terms of preferred embodiments, it is understood that the invention is not limited thereto. To similar arrangements and procedures, the scope of the appended claims should be interpreted to encompass all such modifications, similar arrangements and procedures.

We claim:

1. A method of determining the deployment mode of an airbag, comprising the steps of:

determining the seat weight using a seat weight sensor;

determining the contents of the seat using a living body proximity sensor having an electrostatic capacitance by detecting a change in the electrostatic capacitance of the sensor resulting from a living body located in the proximity of the sensor; and determining the deployment mode of the airbag based on the determinations made using the seat weight and living body proximity sensors.

2. A method of determining the deployment mode of an airbag, comprising the steps of:

determining the seat weight using a seat weight sensor;

determining the contents of the seat using a living body proximity sensor including a coil having an induced voltage by detecting a change in the induced voltage resulting from a living body located in the proximity of the sensor; and determining the deployment mode of the airbag based on the determinations made using the seat weight and living body proximity sensors.

3. A method of determining the presence and the type of object on the seat of the passenger vehicle, comprising the steps of:

determining whether the seat is vacant; and if the seat is not vacant, determining whether the object present on the seat is a child seat, a child, or an adult by the combination of outputs from a seat weight sensor and a living body proximity sensor;

determining that the seat is vacant when the seat weight is below a prescribed value $w_1$; and determining that the living body proximity sensor is out of order when the output value of the living body proximity sensor does not show that the living body is in the proximity thereof and the seat weight is equal to or above a prescribed value $w_3$ that is greater than the prescribed value $w_1$.

4. The method of claim 1, further comprising the steps of:

determining that a child is present on the seat when the output value of the living body proximity sensor shows that the living body is in the proximity thereof and the seat weight is equal to or above the prescribed value $w_1$ and below a prescribed value $w_2$ ($w_1<w_2<w_3$).

5. The method of claim 1, further comprising the steps of:

determining that an adult is present on the seat when the output value of the living body proximity sensor shows that the living body is in the proximity thereof and the seat weight is above a prescribed value $w_2$ ($w_1<w_2<w_3$).

6. A method of determining the presence and the type of object on the seat of the passenger vehicle, comprising the steps of:

determining whether the seat is vacant; and if the seat is not vacant, determining whether the object present on the seat is a child seat, a child, or an adult by the combination of outputs from a seat weight sensor and a living body proximity sensor;

determining that the seat is vacant when the seat weight is below a prescribed value $w_1$; and determining a threshold output value of the living body proximity sensor, wherein the threshold output value is a function f(w) of the output of the seat weight sensor;

determining that a child is present on the seat when the seat weight is equal to or above the prescribed value $w_1$ and below a prescribed value $w_2$ ($w_1<w_2$) and when the output value of the living body proximity sensor is smaller than the threshold output value for the seat weight as determined by the function f(w).

7. The method of claim 6, further comprising the step of determining that an adult is present on the seat when the seat weight is equal to or above the prescribed value $w_1$ and above the prescribed value $w_2$ and when the output value of the living body proximity sensor is smaller than the threshold output value for the seat weight as determined by the function f(w).

8. The method of claim 6, further comprising the step of determining that a child seat is present on the seat when the seat weight is equal to or above the prescribed value $w_1$ and less than a prescribed value $w_3$ ($w_1<w_3$) and when the output value of the living body proximity sensor is equal to or above the threshold output value for the seat weight as determined by the function f(w).

9. The method of claim 6, further comprising the step of determining that an adult is present on the seat when the seat weight is above a prescribed value $w_3$ ($w_1<w_3$) and when the output value of the living body proximity sensor is equal to or above the threshold output value for the seat weight as determined by the function f(w).

10. A method of determining an airbag deployment mode using the combination of an output from a seat weight sensor and an output from a living body proximity sensor, comprising the steps of:

determining a threshold output value of a living body proximity sensor mounted on the seat, wherein the threshold output value is a function f(w) of the output of a seat weight sensor;

determining that a low deployment mode is selected when the seat weight is equal to or above a prescribed value $w_1$ and below a prescribed value $w_2$ ($w_1 < w_2$) and when the output of the living body proximity sensor is smaller than the threshold output for the seat weight as determined by the function f(w).

11. The method of claim 10, further comprising the step of:

determining a normal deployment mode is selected when the seat weight is equal to or above $w_2$, and when the output of the living body proximity sensor is smaller than the threshold output for the seat weight as determined by the function f(w).

12. The method of claim 10, further comprising the step of:

determining that a low deployment mode is selected when the output from the living body proximity sensor is equal to or above the threshold output for the seat weight as determined by the function f(w), and the seat weight is smaller than a prescribed value $w_3$ ($w_1 < w_3$).

13. The method of claim 12, further comprising the step of:

determining that a normal deployment mode is selected when the output from the living body proximity sensor is equal to or above the threshold output for the seat weight as determined by the function f(w), and the seat weight is equal to or above $w_3$.

14. A method of determining an airbag deployment mode using the combination of an output from a seat weight sensor and an output from a living body proximity sensor, comprising the steps of:

determining a threshold output value of a living body proximity sensor mounted on the seat, wherein the threshold output value is a function f(w) of the output of a seat weight sensor;

determining that a no deployment mode is selected when the seat weight is equal to or above a prescribed value $w_1$ and below a prescribed value $w_2$ ($w_1 < w_2$) and when the output of the living body proximity sensor is smaller than the threshold output for the seat weight as determined by the function f(w).

15. The method of claim 14, further comprising the step of:

determining a normal deployment mode is selected when the seat weight is equal to or above $w_2$, and when the output of the living body proximity sensor is smaller than the threshold output for the seat weight as determined by the function f(w).

16. The method of claim 14, further comprising the step of:

determining that a no deployment mode is selected when the output from the living body proximity sensor is equal to or above the threshold output for the seat weight as determined by the function f(w), and the seat weight is smaller than a prescribed value $w_3$ ($w_1 < w_3$).

17. The method of claim 16, further comprising the step of:

determining that a normal deployment mode is selected when the output from the living body proximity sensor is equal to or above the threshold output for the seat weight as determined by the function f(w), and the seat weight is equal to or above $w_3$.

* * * * *